(12) United States Patent
Min et al.

(10) Patent No.: US 11,277,739 B2
(45) Date of Patent: Mar. 15, 2022

(54) ENHANCED PHYSICAL LAYER SECURITY

(71) Applicant: Intel Corporation, Santa Clara, CA (US)

(72) Inventors: Alexander Min, Portland, OR (US); Thomas J. Kenney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 16/650,272

(22) PCT Filed: Dec. 18, 2017

(86) PCT No.: PCT/US2017/067125
§ 371 (c)(1),
(2) Date: Mar. 24, 2020

(87) PCT Pub. No.: WO2019/125391
PCT Pub. Date: Jun. 27, 2019

(65) Prior Publication Data
US 2021/0377728 A1 Dec. 2, 2021

(51) Int. Cl.
| | |
|---|---|
| *H04W 12/037* | (2021.01) |
| *G06F 16/901* | (2019.01) |
| *H04L 9/08* | (2006.01) |
| *H04L 9/32* | (2006.01) |

(52) U.S. Cl.
CPC ...... *H04W 12/037* (2021.01); *G06F 16/9017* (2019.01); *H04L 9/085* (2013.01); *H04L 9/3242* (2013.01)

(58) Field of Classification Search
CPC ... H04W 12/037; G06F 16/9017; H04L 9/085
See application file for complete search history.

(56) References Cited

U.S. PATENT DOCUMENTS

| | | | |
|---|---|---|---|
| 10,397,035 B2 | 8/2019 | Lee et al. | |
| 2007/0223365 A1* | 9/2007 | Tsfaty | H04L 25/03866 370/208 |

(Continued)

FOREIGN PATENT DOCUMENTS

WO 2016159476 A1 10/2016

OTHER PUBLICATIONS

International Search Report and Written Opinion for PCT Application No. PCT/US2017/067125, dated Nov. 5, 2018, 8 pages.

(Continued)

*Primary Examiner* — Ashokkumar B Patel
*Assistant Examiner* — William B Jones
(74) *Attorney, Agent, or Firm* — Eversheds Sutherland (US) LLP

(57) ABSTRACT

This disclosure generally relates to methods, systems, and devices for enhanced physical (PHY) layer security. A device may determine a physical layer (PHY) frame to be sent to a station device. The device may identify an encryption seed sequence to be used for encrypting a first portion of the PHY frame. The device may include an indication of the encryption seed sequence in a first field of one or more fields of the PHY frame. The device may encode the first portion of the PHY frame using the encryption seed sequence. The device may cause to send the PHY frame to the station device.

16 Claims, 10 Drawing Sheets

(56) References Cited

U.S. PATENT DOCUMENTS

| | | |
|---|---|---|
| 2009/0323563 A1* | 12/2009 | Ho .................. H04L 1/0069 370/280 |
| 2013/0235773 A1* | 9/2013 | Wang ............ H04W 52/0203 370/311 |
| 2013/0279382 A1 | 10/2013 | Park et al. |
| 2014/0198780 A1 | 7/2014 | Oi et al. |
| 2017/0048095 A1* | 2/2017 | Sun ................ H04L 27/2646 |
| 2017/0272555 A1* | 9/2017 | Kwon ................ H04L 9/0861 |
| 2019/0036739 A1* | 1/2019 | Lindskog ............ H04W 12/037 |

OTHER PUBLICATIONS

Qinghua Li et al., 'PHY-Level Security Protection', IEEE 802.11-17-0795-03-00az, Jul. 10, 2017.
Alex Reznik et al., 'Security in Wireless Networks: usmg PHY resources to do better', IEEE 802. 11-08/0973r0, Sep. 4, 2008.

* cited by examiner

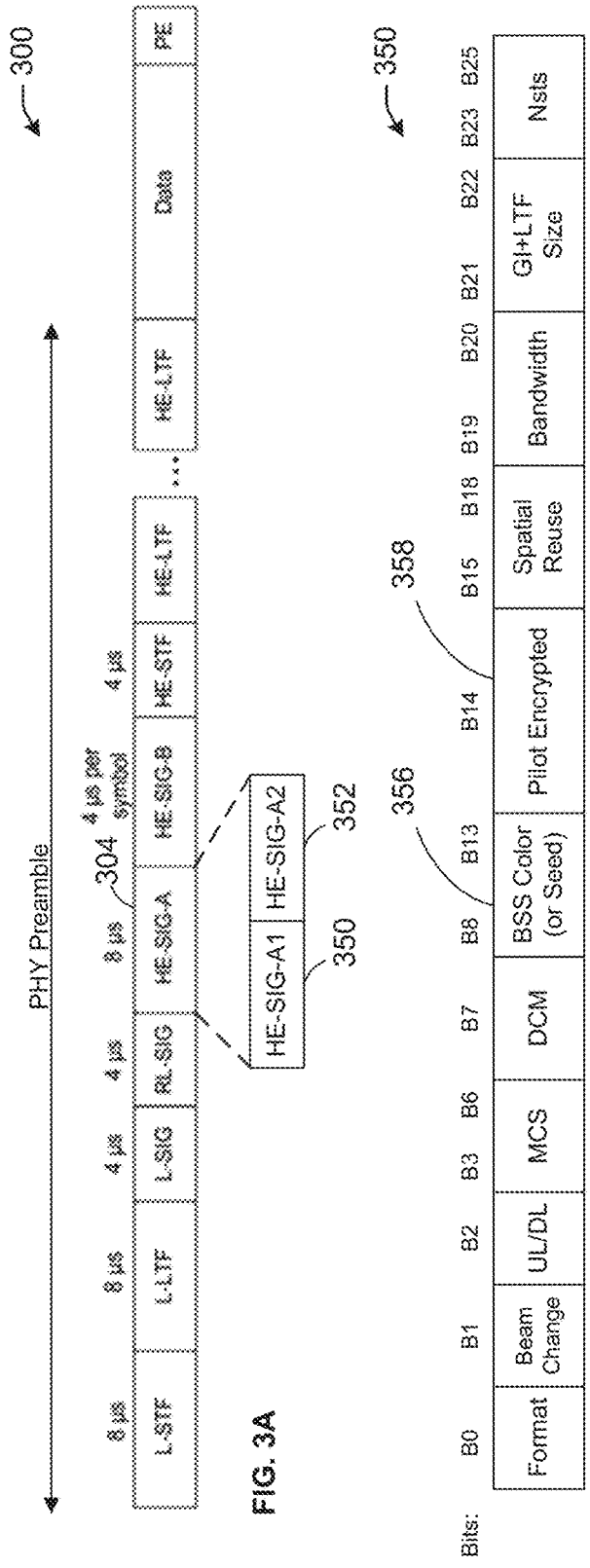
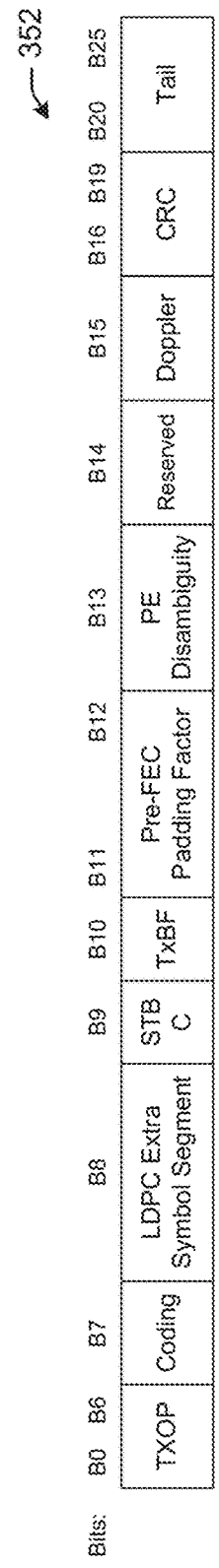
FIGs. 3A-3C

ENHANCED PHYSICAL LAYER SECURITY

CROSS-REFERENCE TO RELATED APPLICATION(S)

This application is a U.S. National Stage Application under 35 U.S.C. 371 and claims the priority benefit of PCT International Application No. PCT/US2017/067125, filed Dec. 18, 2017, the disclosure of which is incorporated herein by reference as if set forth in full.

TECHNICAL FIELD

This disclosure generally relates to systems and methods for wireless communications and, more particularly, to enhanced physical (PHY) layer security.

BACKGROUND

Wireless devices are becoming widely prevalent and are increasingly requesting access to wireless channels to participate in wireless communications. Security of wireless communications is an important aspect in wireless networks.

BRIEF DESCRIPTION OF THE DRAWINGS

FIGS. 3A-3C depict illustrative schematic diagrams for an enhanced physical layer (PHY) layer security system, in accordance with one or more example embodiments of the present disclosure.

DETAILED DESCRIPTION

Figure 1:
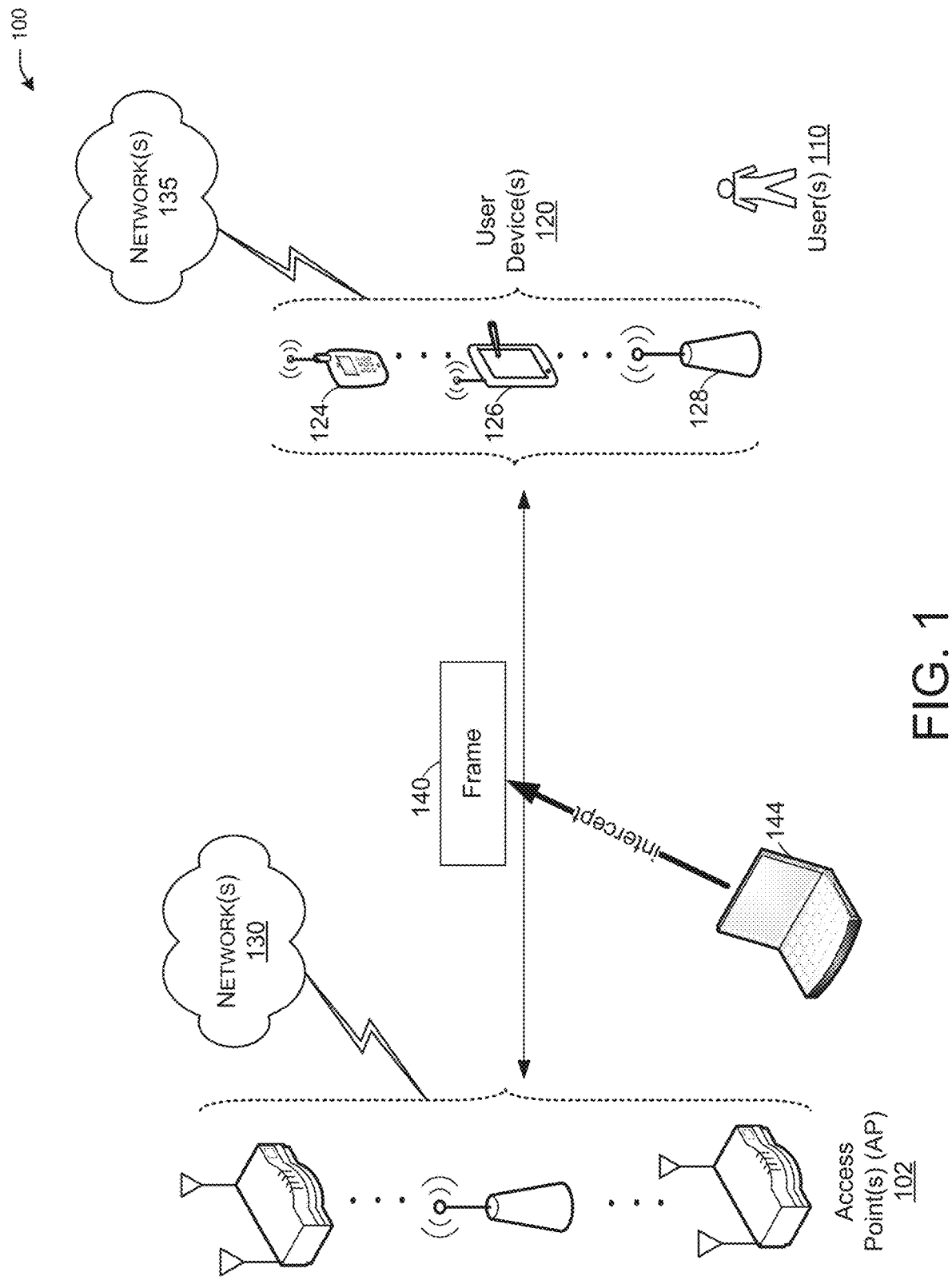
FIG. 1 is a network diagram illustrating an example network environment, in accordance with one or more example embodiments of the present disclosure.

Example embodiments described herein provide certain systems, methods, and devices for enhanced PHY layer security. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In the upcoming IEEE 802.11ax standard, Wi-Fi APs (access points) can schedule/solicit multi-user (MU) uplink (UL) transmissions by sending transmission configuration information, such as an resource unit (RU) allocation, modulation encoding scheme (MCS), etc., for the solicited MU UL physical layer convergence protocol (PLCP) data unit (PPDU) transmissions in a control frame called trigger frame (TF). Upon the receipt of the TF, solicited UL station devices (STAs) respond to the TF by sending MU UL PPDUs using the transmission configuration indicated in the TF.

However, such TFs are broadcast packets and can be easily overheard by any (malicious) devices or attackers, thus making the trigger-based MU UL transmissions vulnerable to various attacks, such as replay, spoofing, denial-of-sleep. For example, when an AP sends a TF, an attacker can detect and record the TF and launch a replay attack later to falsely trigger unrequested MU UL PPDU transmissions from the STAs and prevent them from entering low-power sleep states. Such a TF replay attack is feasible/plausible with advance (and availability) in software defined radio (SDR) platforms, and can easily disrupt the normal operation of the Wi-Fi network especially in a dense Wi-Fi deployment areas.

Previous Wi-Fi standards focused on upper layer (e.g., application layer) security protection mechanisms. There has not been an attempt to create mechanisms to increase security in the physical (PHY) layer protocol. With increased malicious attacks on all systems, it is beneficial to increase the complexity of the security, and if possible, at all layers in the communication stack. Having PHY security can prevent unintended (or malicious) Wi-Fi devices from detecting and decoding Wi-Fi signals transmitted by other legitimate Wi-Fi access points (APs) and stations (STAs).

Malicious devices can store and post-process the received (and decoded) Wi-Fi signals to look into the data payload or infer various information even using the encrypted bits. For example, the recent advances in machine-learning and deep-learning technologies make even correctly decoded bits in the PHY-layer valuable information that can lead to security breaches.

In the future Wi-Fi systems, the FCC (federal communications commission) may open up a new wireless frequency band (e.g., 6-7 GHz) for unlicensed Wi-Fi operation which will allow a new 802.11 PHY/MAC design (a.k.a. greenfield). Therefore, it is a good opportunity to introduce proper security mechanisms in the PHY layer for next generation Wi-Fi systems. Currently there are no efficient mechanisms to prevent malicious 802.11 devices or SDRs from recording and replaying an 802.11ax TF to falsely trigger MU UL transmissions or other types of malicious attacks.

Example embodiments of the present disclosure relate to systems, methods, and devices for enhanced PHY layer security, negotiation and protocol to set up triggered (TD) P2P operation.

In one embodiment, an enhanced PHY layer security system may "encrypt" a certain part of the PHY preamble (e.g., HE-SIG-A) so that only legitimate STAs (those which are associated with the AP) can decode the PHY preamble and proceed to decode the MAC header and data payload.

The PHY preamble will be "encrypted" using a secure key shared between the AP and STAs during association procedure. This will prevent non-legitimate STAs (or malicious devices) from correctly decoding the PHY preamble and detecting the frame type (e.g., TF).

In one embodiment, an enhanced PHY layer security system may encrypt/randomize orthogonal frequency-division multiplexing (OFDM) pilot tone allocations throughout the PPDU so that only legitimate STAs with the pre-shared key (PSK) (e.g., password, paraphrase, etc.) information can correctly identify the pilot tone allocations to decode the entire PPDU. This approach can also be extended to the data tones as well, but this discussion will focus on the pilot tones. Both approaches would provide even more protection. However, implementing the pilot tones protection provides significant protection, and minimizes hardware design changes from previous Wi-Fi standards. For this, a special signaling (SIG) field may be, called Next-Generation (NG)-SIG, as part of the greenfield PHY design for next-generation Wi-Fi. This NG-SIG field may include a "seed" information field where the value of the "seed" field can be used by legitimate STAs to correctly "decrypt" the OFDM pilot (or data) tone allocation for the subsequent OFDM symbols (including additional PHY preambles and data payload. The decryption requires the shared key information exchanged between the AP and legitimate STAs during association process over a secure channel, therefore unintended STAs (e.g., hackers/attackers) cannot correctly decrypt the pilot location and will fail to decode the OFDM symbols following the NG-SIG.

In one embodiment, an enhanced PHY layer security system may provide a new PHY layer protection which will be the first line of defense in the Wi-Fi stack. This will make next generation Wi-Fi systems much more secure, robust and privacy-friendly compared to today's Wi-Fi systems. This is especially the case when the fast advances in machine-/deep-learning are considered and big data analytics, which enable hackers to infer more private information with fewer amounts of low-level (PHY-layer) data.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment, in accordance with one or more example embodiments of the present disclosure. Wireless network 100 may include one or more user device(s) 120 and one or more access point(s) (AP) 102, which may communicate in accordance with IEEE 802.11 communication standards. The user device(s) 120 may be referred to as stations (STAs). The user device(s) 120 may be mobile devices that are non-stationary and do not have fixed locations. Although the AP 102 is shown to be communicating on multiple antennas with user devices 120, it should be understood that this is only for illustrative purposes and that any user device 120 may also communicate using multiple antennas with other user devices 120 and/or AP 102.

Figure 8:
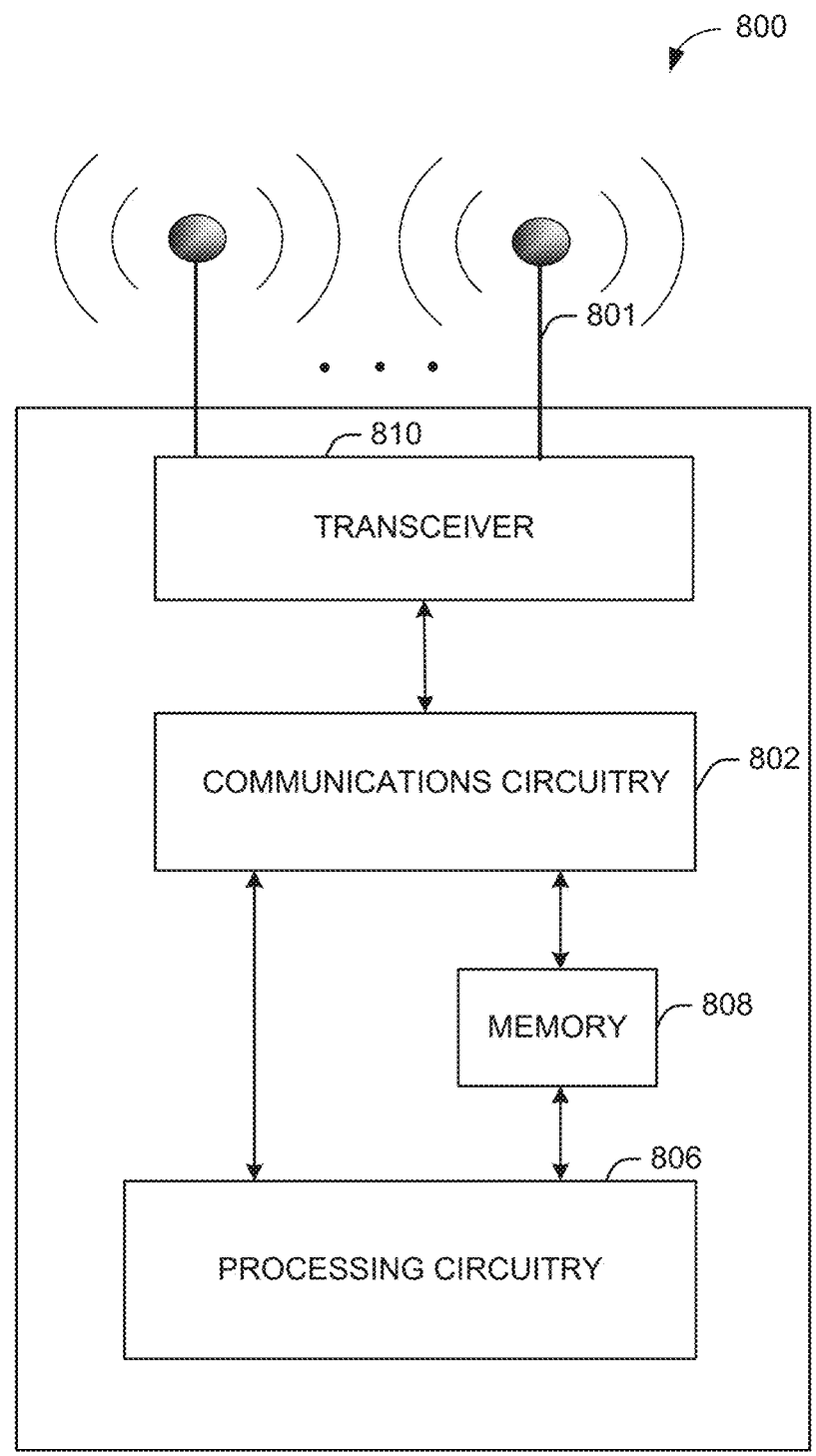
FIG. 8 depicts a functional diagram of an example communication station that may be suitable for use as a user device, in accordance with one or more example embodiments of the disclosure.
Figure 9:
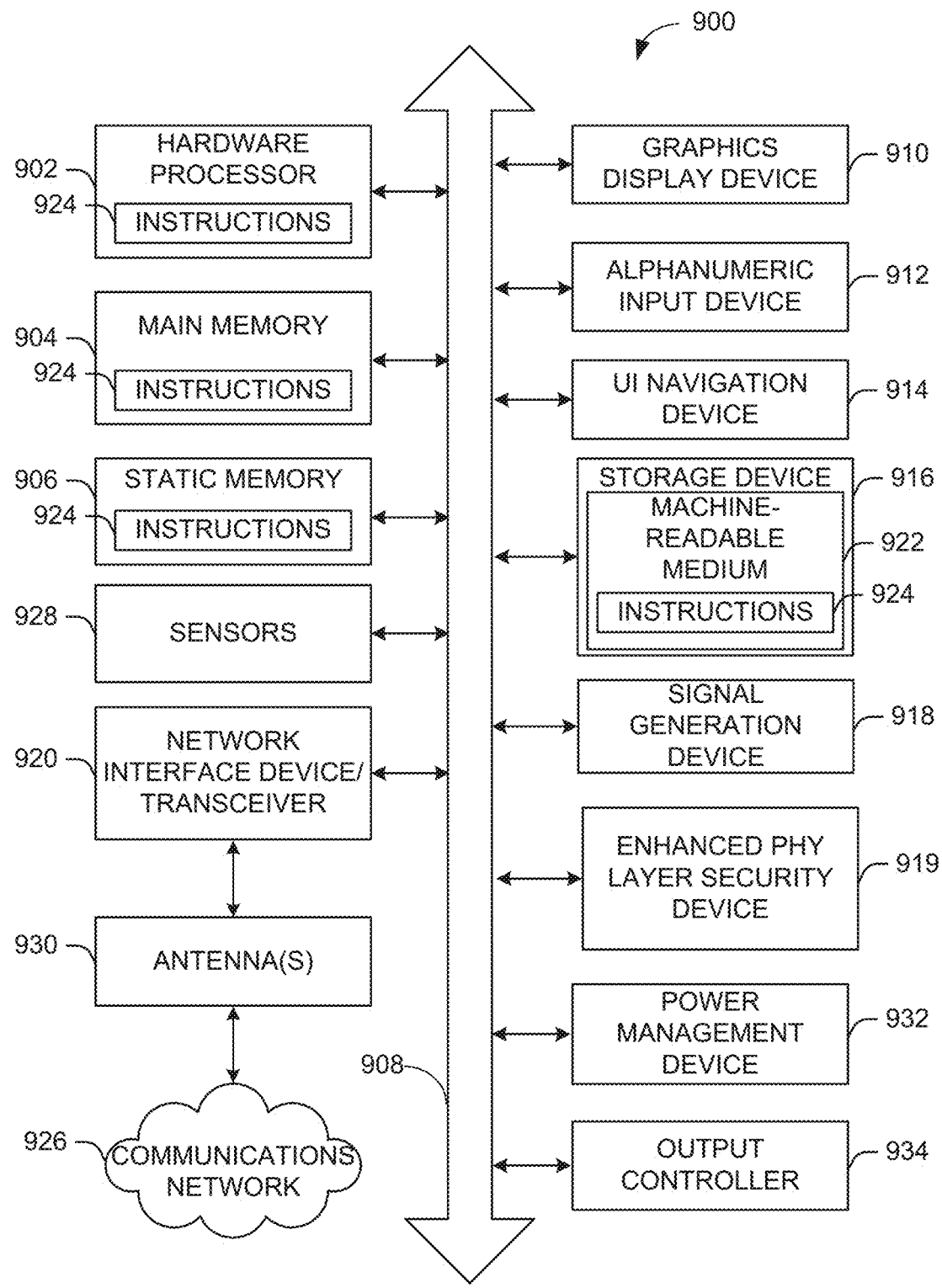
FIG. 9 depicts a block diagram of an example machine upon which any of one or more techniques (e.g., methods) may be performed, in accordance with one or more embodiments of the disclosure.

In some embodiments, the user devices 120 and AP 102 may include one or more computer systems similar to that of the functional diagram of FIG. 8 and/or the example machine/system of FIG. 9.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices such as lamps, climate control, car components, household components, appliances, etc. may also be included in this list.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

In some demonstrative embodiments, the user device(s) 120 and/or the AP 102 may be configured to operate in accordance with one or more specifications, including one or more IEEE 802.11 specifications (e.g., an IEEE 802.11ax specification, and/or any other specification and/or protocol).

In some demonstrative embodiments, a frame such as a frame 140 may be used to communicate between the AP 102 and the user device(s) 120. The frame 140 may be a PHY frame that includes a PHY preamble. In this example, there is shown a hacker device 144 that may intercept the frame 140 and may alter it before it goes from one device to another.

An enhanced PHY layer security system may provide a low complexity, yet efficient, PHY layer security mechanism. The enhanced PHY layer security system may facilitate that only legitimate Wi-Fi STAs (those that are currently associated with the transmitting AP) can correctly unscramble and decode the entire PSDU (PLCP Service Data Unit) transmitted by a legitimate AP or STA. Other legitimate overlapping basic service set (OBSS) STAs (those that are currently associated with other legitimate APs) can still obtain the necessary information (e.g., expected length of the transmission) to properly defer their medium access.

Currently there are no efficient PHY layer security mechanisms that allow only legitimate (or targeted) STAs to correctly descramble and decode received Wi-Fi signals. The lack of efficient PHY layer security mechanisms make the current (and potentially next-gen) Wi-Fi systems vulnerable to various attacks, including eavesdropping, replay, men-in-the-middle, denial-of-service/sleep, and traffic analysis including machine-learning (or deep-learning) based inference, etc. It is understood that the above descriptions are for purposes of illustration and are not meant to be limiting.

Figure 2:
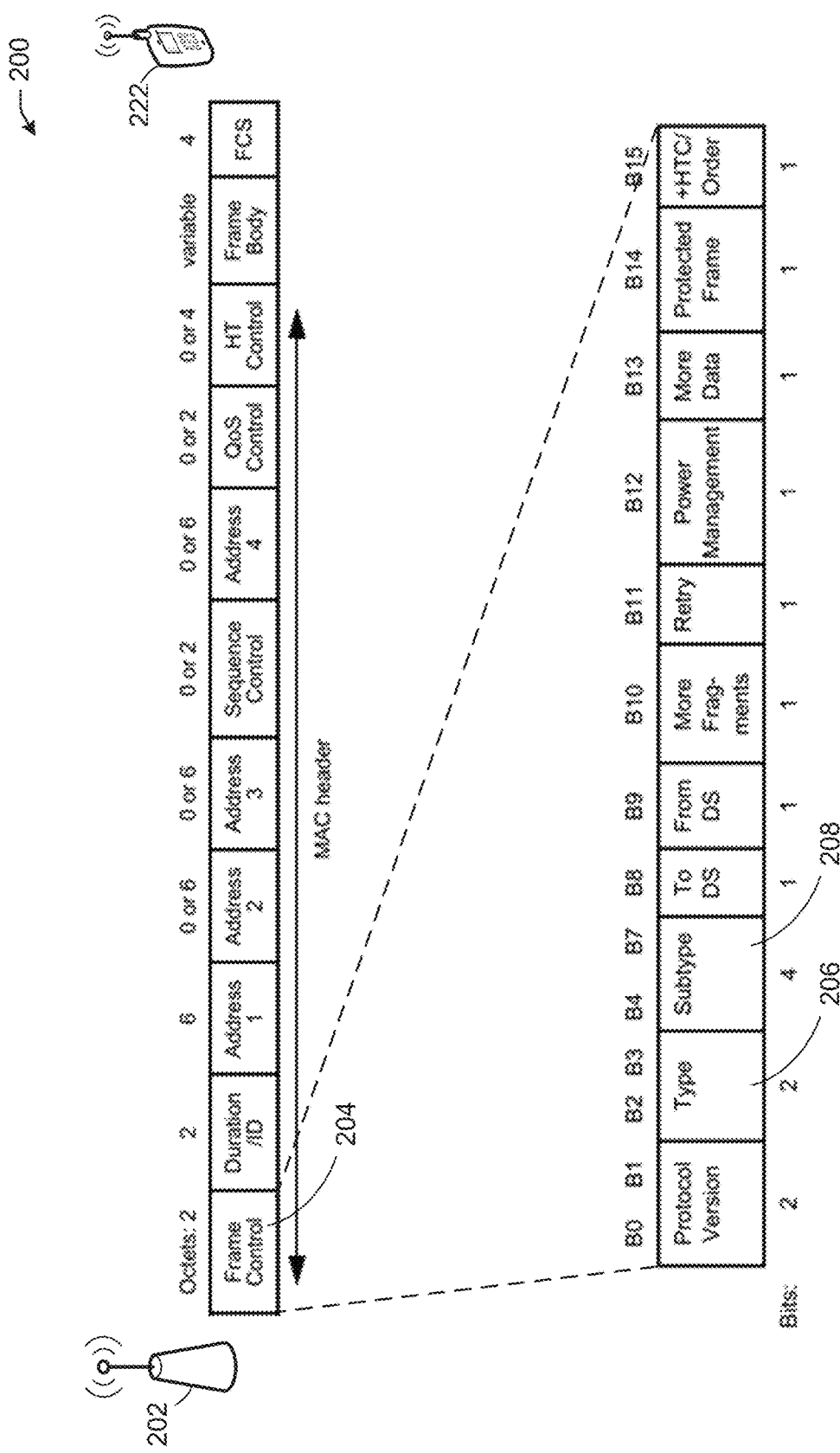
FIG. 2 depicts an illustrative schematic diagram for a medium access control (MAC) frame format and control field.

FIG. 2 depicts an illustrative schematic diagram 200 for an MAC frame format and control field.

Referring to FIG. 2, there is shown an MAC frame format that may be sent from an AP 202 to a user device 222. The MAC frame comprises an MAC header and a frame body, which may be comprised of one or more fields. The MAC header may include a frame control field 204. The frame control field 204 may be comprised of one or more subfields, for example, a type subfield 206 and a subtype subfield 208

Most of the existing security mechanisms focus on the MAC (or above) layer approaches, which cannot prevent attackers from detecting/decoding TFs sent by the AP. A trigger frame is a frame that contains a frame having an MAC header and other fields that may be sent from an AP informing all user devices serviced by the AP that channel access is available. With OFDMA, the AP may transmit a TF for various reasons, such as allocating resources. User devices may use the allocated resource to transmit their data.

For example, an attacker can easily detect TFs sent by the AP by decoding the type subfield 206 and subtype subfield 208 of the frame control field 204 in the MAC header, as shown in FIG. 2. In 802.11ax, TFs are identified by "01 (B3-B2)" in the type subfield 206 and "0010 (B7-B4)" in the subtype subfield 208 field of the frame control field 204.

Once the attacker detects 802.11ax TFs based on the frame control field 204 in the MAC header, then it can store the entire received TF and launch a replay attack by then transmitting the stored baseband samples. Another attack model is that the attacker builds a "fake" TF by setting the "Type" and "Subtype" subfields in the frame control field to indicate a TF. In both cases, the STAs will consider these malicious TFs as a legitimate TF, and respond using a MU UL PPDU transmission.

Such TF-targeted attacks can negatively impact the system performance because STAs need to decode the entire "fake" TF PPDU, during which they cannot receive legitimate PPDUs from the AP. Even worse, if an attacker manipulates (e.g., increases) the "LENGTH" subfield of the legacy signal (L-SIG) field in the fake/replayed PPDU, the PHY receive (RX) chain of the STAs will be stuck decoding the PPDU OFDM symbol for a long time until it processes the expected number of OFDM symbols (e.g., "N_symbol"). It would do that based on the "LENGTH" field before it enters the "End of PSDU RX" state in the PHY receive state machine.

Therefore, an efficient mechanism is needed that allows STAs to detect bogus TFs (or PPDUs) in an earlier state in the PHY state machine so that they do not need to process the entire PPDU wasting time/energy. Note that while a TF is used as an example, the proposed methods can be applied to other types of PPDUs with the HE-SIG-A subfield (or other types of SIG fields in general).

FIGS. 3A-3C depict illustrative schematic diagrams for an enhanced PHY layer security system, in accordance with one or more example embodiments of the present disclosure.

Referring to FIG. 3A, there is shown diagram 300 representing a high-efficiency multi-user (HE MU) PPDU, which comprises a PHY preamble having one or more fields. In 802.11 ax, the PHY preamble may comprise a legacy short training field (L-STF), a legacy long training field (L-LTF), a legacy signal field (L-SIG), a repeat L-SIG (RL-SIG) field, a high-efficiency signal field A (HE-SIG-A) 304, a high-efficiency signal field B (HE-SIG-B), a high-efficiency short training field (HE-STF), one or more high-efficiency long training fields (HE-LTFs), a data field, and other fields. High-efficiency signaling between one or more devices may be split into two fields, the high-efficiency signal A field (HE-SIG-A) and the high-efficiency signal B field (HE-SIG-B). Taken together, the two fields may describe the included frame attributes such as the channel width, modulation and coding, and whether the frame is a single- or multi-user frame.

The HE-SIG-A 304 precedes the other HE fields in the PHY preamble. Its format may depend on whether the transmission is single-user or multi-user. It is comprised of two parts, (each of which corresponds to an OFDM symbol), which are referred to as HE-SIG-A1 (e.g., HE-SIG-A1 350) and HE-SIG-A2 (e.g., HE-SIG-A2 352).

In one embodiment, an enhanced PHY layer security system may use different (randomized) pilot/data tone mapping in constructing the OFDM symbol(s) in the PHY preamble for each PPDU (e.g., TF). "Randomizing" pilot tone means that the transmitter (e.g., AP) will use different pilot/data tone subcarrier locations (as opposed to the conventional "fixed" pilot location as may be defined in a standard) where the pilot tone allocation information is shared only among the legitimate Wi-Fi AP and STAs, which have a shared key that is known to the transmitter (e.g., AP) and the receiver (e.g., STA). Therefore, non-legitimate STAs that do not know/infer the correct pilot/data tone mapping fail to correctly decode the received OFDM symbols. Additionally, the attacker cannot reconstruct/replay the same TF transmission, since each TF transmission will have a new scrambling sequence based on the shared key. Therefore, legitimate STAs will not respond to a bogus TF with a UL transmission. In fact, these STAs will stop decoding the bogus TF (or other PPDUs) when there is a mismatch with the pilot tone allocation information.

In one embodiment, an enhanced PHY layer security system may facilitate encryption of the HE-SIG-A2 field of the PHY preamble. In particular, an enhanced PHY layer security system may encrypt (or randomize) the pilot tone locations of HE-SIG-A2 352. Some of the advantages of encrypting the HE-SIG-A2 may include that by encrypting the HE-SIG-A2, all the legitimate STAs and legitimate overlapping basic service set (OBSS) AP/STAs can detect legacy PHY preambles (e.g., L-STF, L-LTF, L-SIG) and obtain the length information to properly defer from accessing the channel for the length duration indicated in the legacy PHY preamble. Another advantage is that the secure "key/seed" information can be contained in the previous OFDM symbol (e.g., the HE-SIG-A1 350), based on which legitimate STAs compute the pilot tone allocation for the next OFDM symbol (e.g., HE-SIG-A2 352). Further, encrypting the HE-SIG-A2 prevents non-legitimate STAs from correctly decoding the PPDU (including the MAC header) because the PHY preamble is encrypted using a shared key. Since they cannot correctly identify a TF, they cannot launch replay attacks. Plus, this prevents non-legitimate STAs from constructing a valid TF that can be decoded by legitimate STAs because the PHY preamble is "encrypted" using a shared key. TFs constructed by an attacker without using the valid shared key cannot be correctly decoded by legitimate STAs. For example, even if an attacker (e.g., SDR) constructs a bogus TF, legitimate STAs will fail to decode the PHY preambles (e.g., fail at cyclic redundancy code (CRC) check for the HE-SIG-A field) of the bogus PPDUs. Thus, they will not try to decode the entire PPDU and will not respond to the bogus TFs soliciting MU UL transmissions.

In one embodiment, an enhanced PHY layer security system may facilitate construction of the HE-SIG-A1 350 and the HE-SIG-A2 352 fields to prevent hackers from correctly decoding the information included in these fields. The HE MU PPDU format used for an 802.11ax TF includes the HE-SIG-A field which consists of two OFDM symbols (each OFDM symbol length of 4 μs), (e.g., 4 μs for HE-SIG-A1 and 4 us for HE-SIG-A2, as shown in FIGS. 3A-3C).

The two OFDM symbols in the HE-SIG-A fields are encoded using a convolution (BCC) encoder at the rate 1/2, and modulated using binary phase shift keying (BPSK). The 26 bit information for the HE-SIG-A1 field is encoded at rate 1/2, and the 52 encoded bits are interleaved bits and are modulated using BPSK and mapped into 52 data subcarriers. Then 4 pilot tones are inserted at subcarrier indexes ±7 and ±21. The next 26 bit information for the HE-SIG-A2 field is encoded/modulated in the same way for the second OFDM symbol, and the pilots are inserted at the same location, (e.g., ±7 and ±21).

In one embodiment, an enhanced PHY layer security system may introduce a new bit that replaces a reserve bit in the HE-SIG-A1. The new bit may be identified as a "pilot encrypted" subfield. For example, looking at HE-SIG-A1 350 in FIG. 3B, the pilot encrypted subfield 358 may be used by the AP to indicate whether there is encryption or not. For example, in order for legitimate STAs to compute the pilot tone allocation of HE-SIG-A2 352, the transmitter (e.g., AP) uses the "BSS Color (B8-B13)" subfield 356 and the "Pilot Encrypted (B14)" subfield 358. The AP may set the value of the "Pilot Encrypted (B14)" subfield 358 (currently "Reserved") to "1" to indicate that the BSS color subfield 356 contains the "seed" value for computing pilot mapping information for HE-SIG-A2 subfield decoding. This way, when the receiver (e.g., STA) receives the HE-SIG-A1, it would be able to decode the pilot encrypted subfield 358 to determine the seed needed to decrypt the pilot tone mapping for HE-SIG-A2.

In one embodiment, an enhanced PHY layer security system may convey the "seed" value for pilot tone mapping in the 6-bit "BSS Color" subfield 356. If the value of the pilot encrypted subfield is "1", the STAs will interpret the value of the "BSS Color" subfield 356 as the seed value; otherwise, the STA will use the conventional pilot tone allocation to decode the HE-SIG-A2.

Note that the proposed frame formats/fields are shown as examples for the purpose of illustration. For example, potentially another bit in the SIF field can be repurposed based on the mode of operation, or a new frame format can be defined as an extension to the current draft 802.11ax or beyond 802.11ax standard (Next Big Thing).

In one embodiment, an enhanced PHY layer security system may randomize the pilot tone allocation for HE-SIG-A2 based on the "seed" value included in the BSS color subfield 356 by employing one or more mechanisms. There can be multiple ways to randomize the pilot tone allocation for the OFDM symbol which contains the HE-SIG-A2 subfield. For example, a first mechanism may be a "keyed-hash" based encryption, and a second mechanism may include an exclusive OR (XOR) based encryption.

In one embodiment, using a keyed-hash based encryption mechanism, and based on the shared key information and the "seed (or message)" value in the BSS color subfield 356, the STAs can calculate the pilot tone allocation index, for example, using a keyed hashing function (e.g., MD5, SHA-1, or any other hashing function). For example, the STAs can use a keyed hash message authentication code (HMAC) to calculate the pilot allocation information based on the shared key and the "seed" value in HE-SIG-A1 350, as follows: Pilot Index=HMAC (shared key, seed) mod N; where the pilot index will be used to find the pilot allocation from a pre-defined lookup table (which is shared between the AP and STAs). N can be the size of the lookup table. Note that the legitimate STAs obtain shared key information during their association/authentication process.

It is understood that the above descriptions are for purposes of illustration and are not meant to be limiting.

Figure 4:
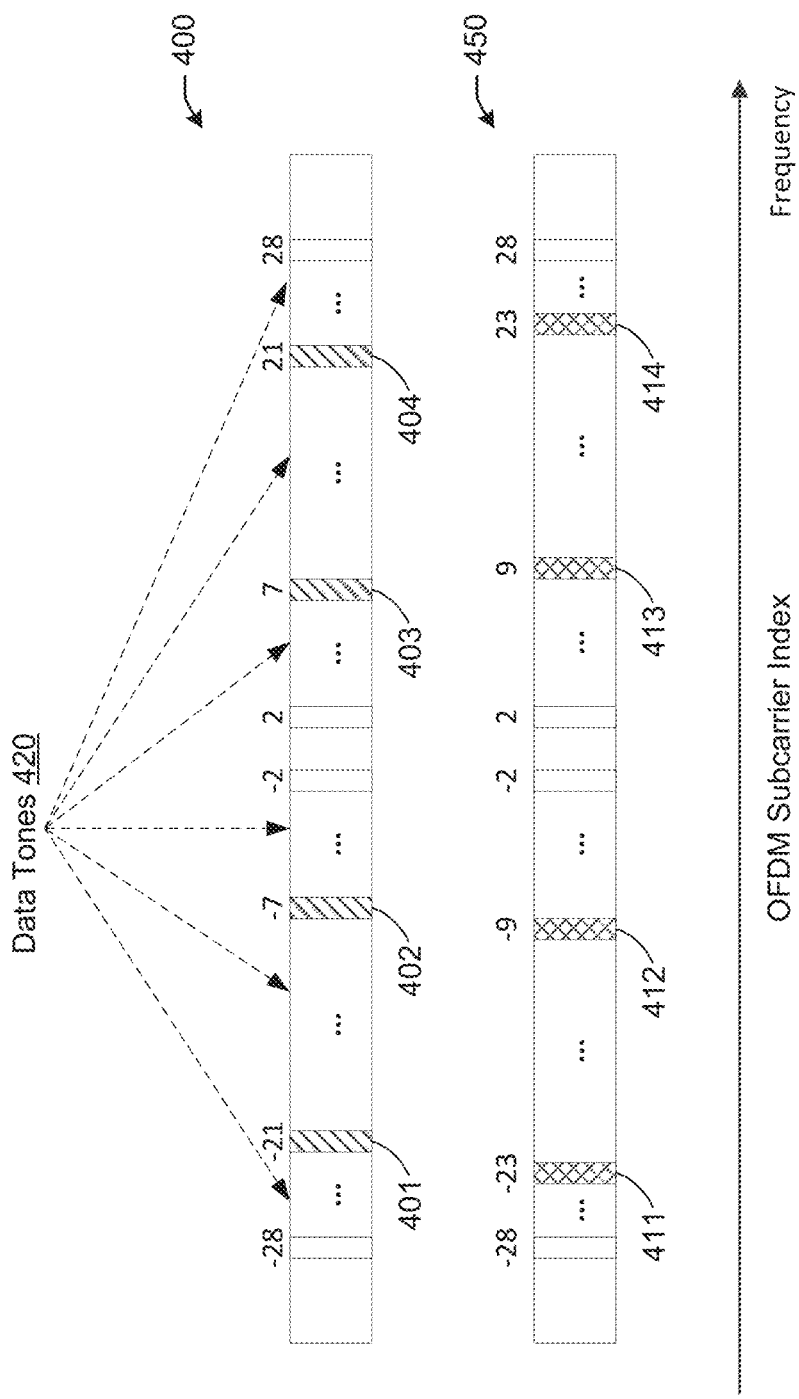
FIG. 4 depicts an illustrative schematic diagram for an enhanced PHY layer security system, in accordance with one or more example embodiments of the present disclosure.

FIG. 4 depicts an illustrative schematic diagram for an enhanced PHY layer security system, in accordance with one or more example embodiments of the present disclosure.

Referring to FIG. 4, there is shown symbols HE-SIG-A1 and HE-SIG-A2 pilot and data tone allocations.

In one embodiment, an enhanced PHY layer security system may facilitate XOR-based encryption to randomize the pilot tone allocation for the OFDM symbol. In that case, Pilot Index=(last 6 bits of shared key ⊕ seed) mod N; where ⊕ denotes the bit-wise XOR operation. The XOR operation can be done within a few clock cycles, minimizing additional processing latency in the PHY processing. When the receiver receives the seed information inside the received frame, the receiver will perform similar operations (e.g., using XOR) in order to deduce the pilot index. A hacker would not be able to deduce the pilot index because the hacker would not have access to the shared key or the specific way the pilot index was calculated (e.g., using the last six bits of the shared key in the bitwise XOR operation).

In one embodiment, an enhanced PHY layer security system may facilitate the use of a lookup table for randomizing the pilot tone allocation. The lookup table may be known by the transmitter and by the receiver. Table 1 below shows an example of the pilot tone allocation lookup table for 20 MHz PPDU. For example, the transmitter may send the pilot index, and the receiver may then use that pilot index in order to locate in the table the actual pilot allocation. For example, if the pilot index transmitted was 1, the receiver may then use 1 as an index to the table and determine that the pilot allocation is ±6, ±20. Note that the table shown below is an example for the purpose of illustration, and different pilot allocations can be used for randomization. For example, the pilot allocation can be a pre-defined pattern/sequence, e.g., a different pilot allocation for each OFDM symbol, which provides even more protection.

TABLE 1

An example pilot allocation look-up table for 20 MHz PPDU.

| Pilot Index | 0 | 1 | 2 | 3 | 4 | 5 |
|---|---|---|---|---|---|---|
| Pilot allocation | ±5, ±19 | ±6, ±20 | ±7, ±21 | ±8, ±22 | ±9, ±23 | ±10, ±24 |

In one embodiment, an enhanced PHY layer security system may be configured to determine pilot tone index locations for a signaling field of the PHY preamble. For example, the signal field may be an HE-SIG-A2, a next-generation signal field, or any other field within the PHY preamble.

Referring to FIG. 4, there is shown an example of pilot tone allocation (tone index locations) in the HE-SIG-A1 400, which contains information of the encrypted pilot tone allocation that should be used when decoding HE-SIG-A2 450 in the PHY preamble. The pilot tone allocation for HE-SIG-A1 400 and HE-SIG-A2 450 with the "randomized" pilot tone allocation may be calculated based on the key-hashed value or the pilot tone allocation look-up table. In this example, the OFDM pilot subcarrier for HE-SIG-A1 comprises the conventional pilot tone index locations (e.g., pilot tone indexes 401, 402, 403, and 404). These pilot tone indexes have actual values of ±21 and ±7.

The OFDM pilot subcarrier for HE-SIG-A2 is shown to be randomized using one or more of the above methods. Therefore, the pilot tone index locations for HE-SIG-A2 are shown to be pilot tone indexes 411, 412, 413, and 414. These pilot tone indexes have actual values of ±23 and ±9. Alternatively and/or additionally, the data tone locations can also randomized as well. The data tones are shown in these figures as the tones surrounding the pilot tones, except for the DC=0. This may be less appealing with a convolutional encoder since it would potentially change the interleaver depth, but when low-density parity-check (LDPC) is used it provides additional security. It is understood that the above descriptions are for purposes of illustration and are not meant to be limiting.

Figure 5:
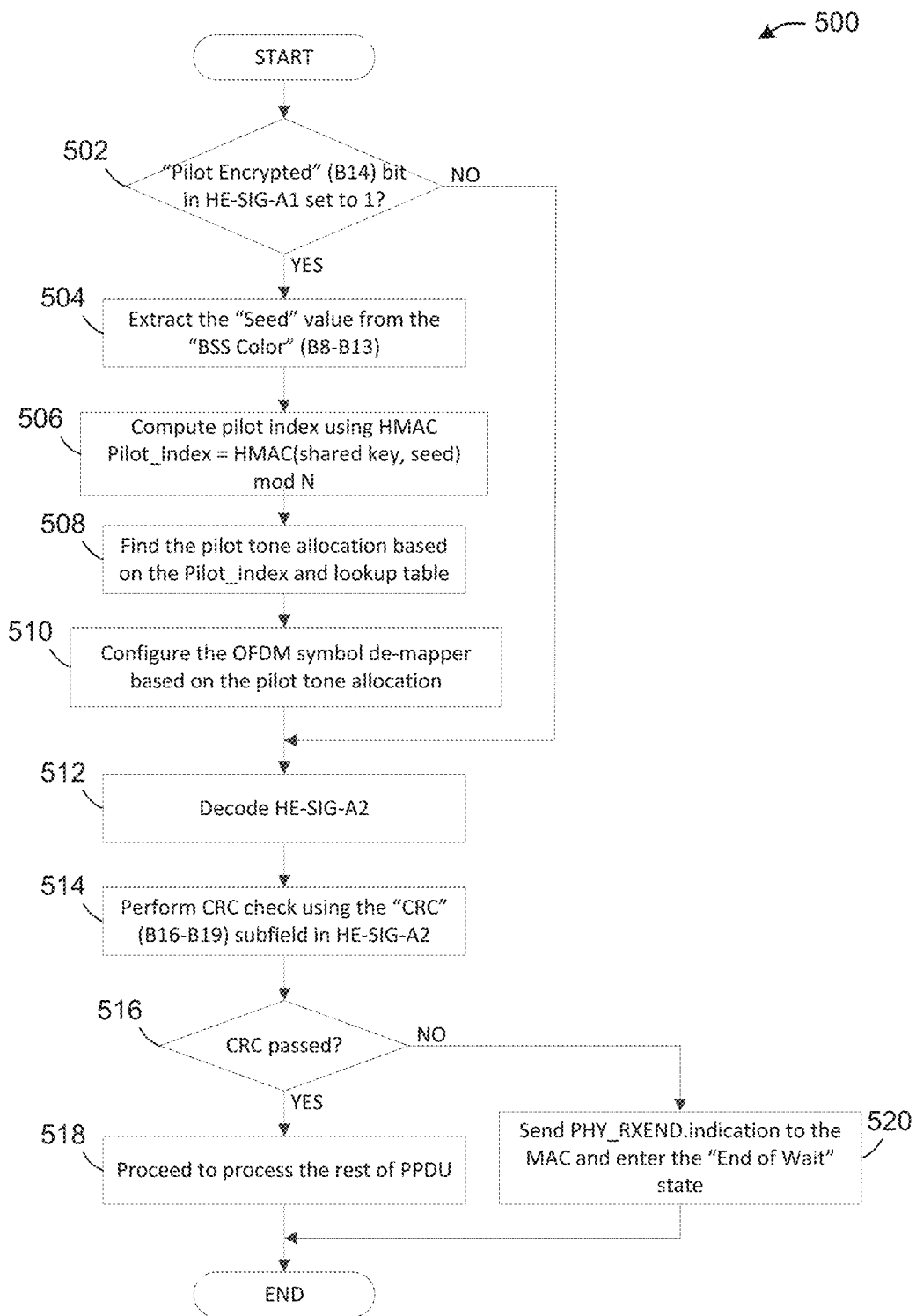
FIG. 5 depicts an illustrative flowchart for an enhanced PHY layer security system, in accordance with one or more example embodiments of the present disclosure.

FIG. 5 depicts an illustrative flowchart 500 for an enhanced PHY layer security system, in accordance with one or more example embodiments of the present disclosure.

Referring to FIG. 5, there is shown an example of devices in accordance with high-efficiency devices (e.g., 802.11ax) for the behavior of the receivers when they receive the PHY preamble that contains the encrypted field.

In one embodiment, an enhanced PHY layer security system may facilitate that once the STAs find the pilot/data tone allocation (pilot tone index locations) based on information in HE-SIG-A1, they use them in the OFDM symbol de-mapper to decode the next OFDM symbol, for example, HE-SIG-A2. Note that HE-SIG-A1 will be encoded with the conventional pilot/data tone allocation. Therefore, non-legitimate STAs may be able to correctly decode the HE-SIG-A1, but will fail to decode the HE-SIG-A2. As a result, the non-legitimate STAs will fail at the CRC (B16-B19) check for HE-SIG-A and send a PHY_RXEND.indication (format violation) to the MAC and enter the "End of Wait" state in the PHY receiver state machine. This will halt the processing of the PHY preamble.

At block 502 when an STA (e.g., a user device 120 of FIG. 1) receives a PHY preamble, it may receive an HE-SIG-A1 before receiving the HE-SIG-A2. The STA may decode the HE-SIG-A1 knowing that the pilot tone index locations are the conventional pilot tone allocations (e.g., based on the 802.11 standard). The STA may determine a bit (referred to herein as Pilot Encrypted) which may be located at bit 14 (B14) in this example. It should be understood that although bit 14 is used, other available bits may be used to indicate whether the pilot tone index locations are encrypted or not.

At block 504, the STA may identify a field (e.g., BSS color) in the HE-SIG-A1. This field may contain the seed value needed to decrypt a next symbol (e.g., HE-SIG-A2). The STA may attract the seed value from this field. For example, the BSS color may be found between bit 8 and bit 13 in the HE-SIG-A1. It should be understood that although the BSS color is used to hold the seed value, other fields may be used to contain the seed value.

At block 506, using the extracted seed value, the STA may compute the pilot tone index locations using one or more mechanisms. A first mechanism may be a "keyed-hash" based calculation and a second mechanism may include using exclusive OR (XOR) based decryption. In the keyed hash based calculation, for example, the STA can use a keyed hash message authentication code (HMAC) to calculate the pilot allocation information based on the shared key and the "seed" value in HE-SIG-A1, as follows: Pilot Index=HMAC (shared key, seed) mod N; where the pilot index will be used to find the pilot allocation from a pre-defined lookup table (which is shared between the AP and STAs). N can be the size of the lookup table.

At block 508, the STA may find the pilot tone allocation based on the Pilot Index and the lookup table. The lookup table may have a correlation between the Pilot Index and the pilot tone index locations. For example, at Pilot Index 1, the pilot allocations may be ±6, ±20.

At block 510, the STA may configure its OFDM symbol de-mapper based on the pilot tone allocations determined from the table.

At block 512, the OFDM symbol de-mapper may decode a next OFDM symbol, for example, HE-SIG-A2.

At block 514, the STA may perform a CRC check using the CRC subfield in HE-SIG-A2 to detect errors occurring during data transmission.

At block 516, the STA may determine whether the CRC passed or not. If the CRC fails, this indicates that there were errors in the decoded HE-SIG-A2. If the CRC passes, this indicates that there were no errors in the decoded HE-SIG-A2.

At block 518, in case the CRC passes, the STA may proceed to decode the rest of the frame (e.g., PPDU).

At block 520, in case the CRC failed, the STA may send a PHY_RXEND.indication (format violation) to the MAC and enter the "End of Wait" state in the PHY receiver state machine. This will halt the processing of the PHY preamble.

It is understood that the above descriptions are for purposes of illustration and are not meant to be limiting.

Figure 6:
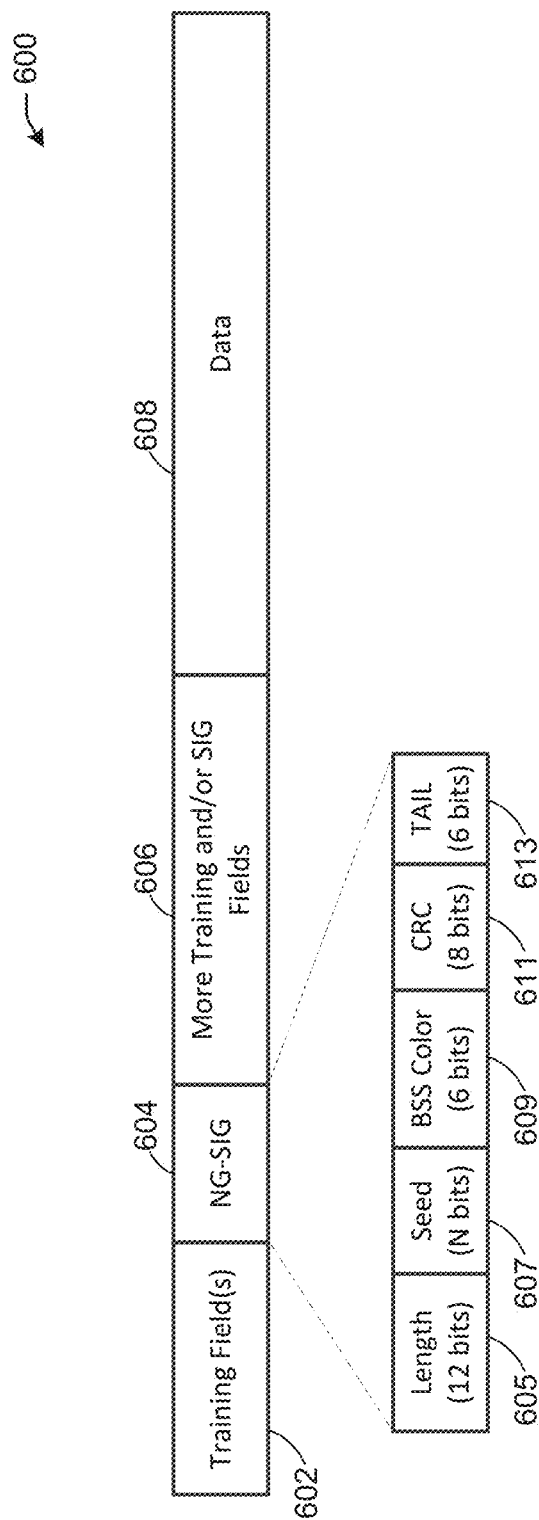
FIG. 6 depicts an illustrative schematic diagram for an enhanced PHY layer security system, in accordance with one or more example embodiments of the present disclosure.

FIG. 6 depicts an illustrative schematic diagram 600 for an enhanced PHY layer security system, in accordance with one or more example embodiments of the present disclosure.

Referring to FIG. 6, there is shown a next generation PPDU that may be comprised of one or more fields. The enhanced PHY layer security system may be designed with the following considerations: (1) it facilitates that the embodiments for encrypting/randomizing pilot (or data) tone allocation can be implemented at the receiver (e.g., STAs) with low complexity and overhead. The receiver may need to dynamically reconfigure the OFDM tone de-mapper configuration based on the lookup table; (2) while a PHY signaling field (e.g., NG-SIG) design allows only the legitimate (targeted) STAs to decode the rest of the PPDU, the NG-SIG field itself is not encrypted, and all the STAs (including the OBSS STAs) can properly defer (and correctly set the network allocation vector (NAV) if needed) based on information in NG-SIG; and (3) the enhanced PHY layer security may provide energy efficiency since the NG-SIG field conveys the BSS identification information (e.g., BSS Color field) which allows the OBSS STAs to promptly abort the PHY decoding process if the received signal is transmitted from the OBSS AP or STAs.

Referring to FIG. 6, there is shown a simplified example PPDU (e.g., NG-SIG PPDU 600) frame format for next-generation (NG) Wi-Fi including an illustrative NG-SIG field. Note, for the next-generation systems in the new bands, it is very likely that all of these fields outlined below, except the "seed" field, will be required for normal communications with the STA. Thus these are not considered overhead, but are presented for completeness since the approach requires the introduction of a new, yet to be defined NG-SIG field.

In the example of FIG. 6, the NG PPDU 600 is illustrated as consisting of the one or more subfields. For example, training field (s) 602, NG-SIG field 604, more training and/or SIG fields 606, and data field 608.

The NG-SIG PPDU 600 may start with training field(s) 602 for packet acquisition, detection, automatic gain control (AGC), time/frequency synchronization, channel estimation, etc.

The NG-SIG field 604 may be a signaling field that may convey an N-bit "seed" value (e.g., seed subfield 607) which is needed to "decrypt" pilot tone allocation information where the size of the "seed" subfield can vary depending on the implementation. The NG-SIG field 604 conveys one or more subfields containing information. For example, the NG-SIG field 604 may comprise a length subfield 605 (about 12 bits), which indicates the size of the PPDU (e.g., in terms of bytes). It should be noted that the "length" fields can be used by the OBSS STAs to calculate the expected transmission (and the total number of OFDM symbols) of the current PPDU. The STAs can assume a fixed rate, (e.g., 6 Mbps) to convert the length to the expected time. The NG-SIG field 604 may comprise a BSS Color subfield 609 (about 6 bits), which indicates the "BSS Color" value so that the STAs can differentiate the transmissions from the same BSS from the ones from the OBSSes. It should be noted that it is important for the STAs to identify the OBSS signal. STAs cannot "decrypt" the pilot tone allocation of the OBSS transmissions because they do not have the "pre-shared key (PSK)" information of other BSSes. Upon the detection of the OBSS signal based on the "BSS Color" fields, the STAs should attempt to "decrypt" the pilot tone allocation and decode the subsequent OFDM symbols in order to save energy. The NG-SIG field 604 may also include a CRC subfield 611 (about 8 bits), which may be used to check the integrity of the NG-SIG field 604. If a receiver fails to pass the CRC check, the receiver chain will abort the decoding process. The NG-SIG field 604 may also include a tail subfield 613 (about 6 bits), which is used to terminate the trellis of the convolutional decoder in case binary convolutional coding (BCC) is used to encode the NG-SIG field 604.

This tail subfield 613 may not be needed if low-density parity-check (LDPC) is used for the NG-SIG field 604.

The more training and/or SIG Fields 606 may be included because there could be more training and signaling fields that need to be conveyed to the receiver (e.g., an STA). The data field 608 may comprise the data payload.

In one embodiment, an enhanced PHY layer security system may encrypt pilot tone allocation based on the "seed" value 607 in the NG-SIG field 604. For example, the enhanced PHY layer security system may use a keyed-hash above described methods can be also used to randomize the scrambler seed at the receiver. For example, in 802.11ac/ax systems, receivers can extract the scrambler seed from the CH_BANDWIDTH_IN_NOT_HT and DYN_BAND-WIDTH_IN_NOT_HT parameters, as shown in Table 1 below. Encrypting the scrambler seed can provide an additional layer of protection.

Table 1: Contents of the first 7 bits of the scrambling sequence.

TABLE 1

Contents of the first 7 bits of the scrambling sequence.

| | | First 7 bits of scrambling sequence | | | |
|---|---|---|---|---|---|
| | | B0 B3 | B4 | B5 | B6 |
| Parameter | Condition | | Transmit order → | | |
| TXVECTOR | CH_BAND-WIDTH_IN_NON_HT is present and DYN_BAND-WIDTH_IN_NOT_HT is not present in TXVECTOR | 5-bit pseudorandom nonzero integer if CH_BANDWIDTH_IN_NON_HT equals CBW20 and a 5-bit pseudorandom integer otherwise | | CH_BAND-WIDTH_IN_NON_HT | |
| TXVECTOR | CH_BAND-WIDTH_IN_NON_HT is present and DYN_BAND-WIDTH_IN_NOT_HT is present in TXVECTOR | 4-bit pseudorandom nonzero integer if CH_BAND-WIDTH_IN_NON_HT equals CBW20 and DYN_BAND-WIDTH_IN_NON_HT equals Static, and a 4-bit pseudorandom integer otherwise | DYN_BAND-WIDTH_IN_NON_HT | | |
| RXVECTOR | CH_BAND-WIDTH_IN_NON_HT and DYN_BAND-WIDTH_IN_NOT_HT are present in RXVECTOR | — | DYN_BAND-WIDTH_IN_NON_HT | CbwInNonHtTemp is set to this subfield of first 7 bits of scrambling sequence; then CbwInNonHtTemp is mapped according to Table 17-9 to CH_BAND-WIDTH_IN_NON_HT | | based encryption. In that case and based on the pre-shared key (PSK) information and the "seed (or message)" value 607 in NG-SIG field 604, the STAs can calculate the pilot tone allocation index, for example, using the keyed hashing function, e.g., MD5, SHA-1, etc. For example, the STAs can use a keyed-hash message authentication code (HMAC) to calculate the pilot allocation information based on the shared key and the "seed" value 607, as follows: Pilot Index=HMAC (shared key, seed) mod N, where the Pilot Index will be used to find the pilot allocation from a pre-defined lookup table (which is shared between the AP and STAs). N can be the size of the lookup table. Note that legitimate STAs obtain shared key information during their association/authentication process. Alternatively, pilot tone allocation can be computed in a lightweight fashion, e.g., using XOR (Exclusive OR) operation. Pilot Index=(last N bits of shared key ⊕ seed) mod N, where ⊕ denotes the bit-wise XOR operation. The XOR operation can be done within a few clock cycles, minimizing additional processing latency in the PHY processing.

In one embodiment, an enhanced PHY layer security system may encrypt a scrambler seed. For example, the In one embodiment, when an STA (e.g., a user device 120 of FIG. 1) receives a PHY packet, it may calculate the expected transmission time (and the number of OFDM symbols) based on the "length" subfields in NG-SIG field. The STA may check the value of the "BSS Color" subfield and match it with its own BSS Color to identify the source of the signal, i.e., same BSS versus other BSSes. If it is an overlapping basic service set (OBSS) signal, then the STA may perform the CRC check and stop decoding the rest of the PPDU. The STA may then set the NAV value based on the "length" fields to properly defer medium access. If it is the same BSS signal, then the STA may perform a CRC check and may compute the pilot tone allocation index (e.g., Pilot Index) based on the shared key and the seed value in the NG-SIG field using one or more methods (e.g., HMAC or XOR). The STA may then use the calculated Pilot Index to find (e.g., via the lookup table) the pilot tone allocation/pattern used for the rest of the OFDM symbols within the same PPDU. It should be noted that unregistered/unassociated STAs do not have the "shared key" information. Therefore, they cannot correctly decrypt and compute the Pilot Index information even with the "seed" value in the NG-SIG field, which prevents them from decoding the rest of the PPDU including other signaling fields/information and data payload. It is understood that the above descriptions are for purposes of illustration and are not meant to be limiting.

Figure 7A:
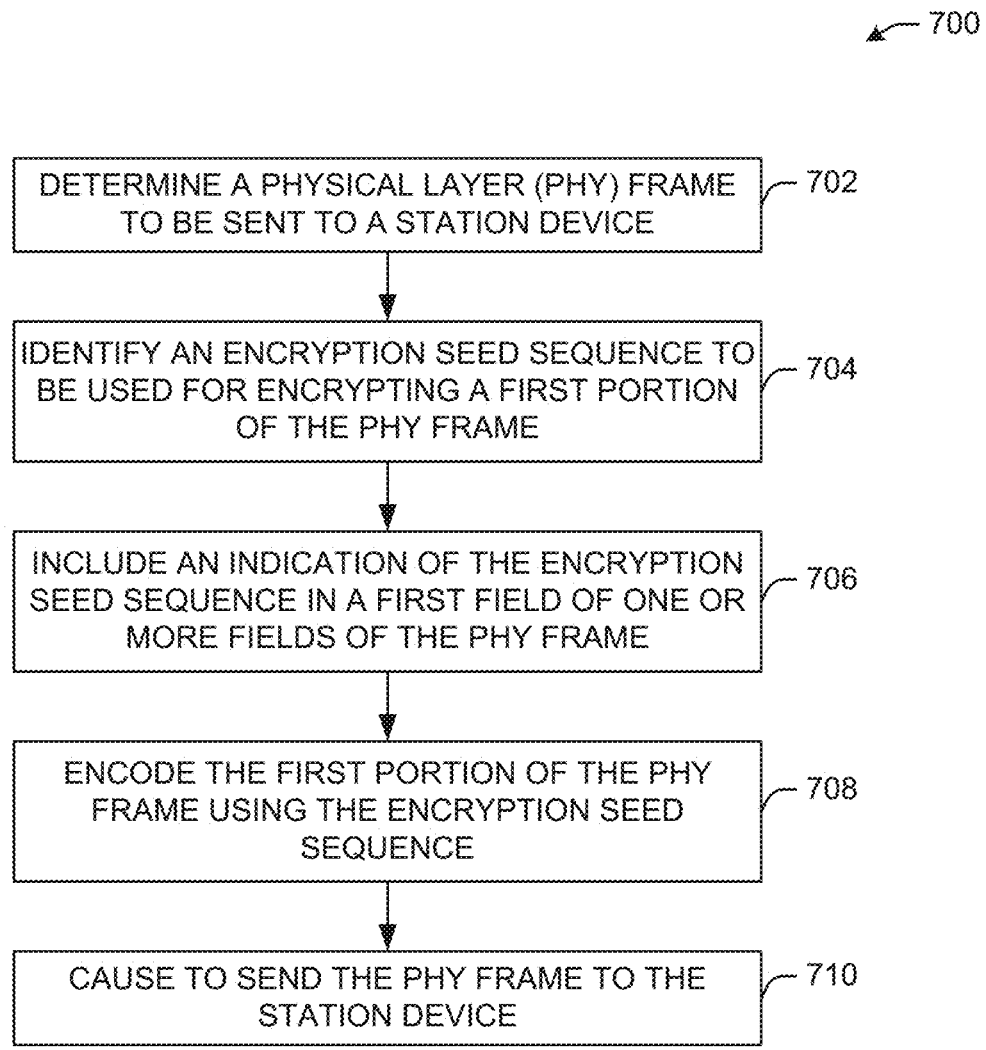
FIG. 7A illustrates a flow diagram of illustrative process for an illustrative enhanced PHY layer security system, in accordance with one or more example embodiments of the present disclosure.

FIG. 7A illustrates a flow diagram of an illustrative process 700 for an illustrative enhanced PHY layer security system, in accordance with one or more example embodiments of the present disclosure.

At block 702, a device (e.g., the user device(s) 120 and/or the AP 102 of FIG. 1) may determine a physical layer (PHY) frame to be sent to another device (e.g., the user device(s) 120 and/or the AP 102 of FIG. 1). For example, an AP may want to send a PHY frame to an STA (e.g., a user device 120 of FIG. 1).

At block 704, the device may identify an encryption seed sequence to be used for encrypting a first portion of the PHY frame. For example, the AP may "encrypt" a certain part of the PHY frame (e.g., HE-SIG-A or NG-SIG fields) so that only legitimate STAs (those which are associated with the AP) can decode the PHY frame and proceed to decode the MAC header and data payload. The PHY frame will be "encrypted" using a secure key shared between the AP and STAs during the association procedure. This will prevent non-legitimate STAs (or malicious devices) from correctly decoding the PHY frame and detecting the frame type (e.g., TF).

At block 706, the device may include an indication of the encryption seed sequence in a first field of one or more fields of the PHY frame. For example, in order for legitimate STAs to compute the pilot tone allocation of a next symbol, the AP may use the "BSS Color" subfield. The AP may set the value of a predetermined bit (e.g., "Reserved") to "1" to indicate that the BSS color subfield contains the "seed" value for computing pilot mapping information for decoding one or more next symbols/fields in the PHY frame or PPDU.

At block 708, the device may encode the first portion of the PHY frames using the encryption seed sequence. For example, the AP may use the seed value found in the BSS color subfield to encode a signaling field (e.g., HE-SIG-A2) or additional fields in a PPDU. During the encoding of such fields, the pilot tones may be inserted at randomized locations based on the seed value. This way, only receivers that have the correct pilot locations would be able to decode these fields when they are received.

At block 710, the device may cause to send the PHY frame to the station device. For example, the AP may send the PHY frame to the STA. If this frame gets intercepted by a hacker, the hacker may not be able to decode the portion of the frame that was encoded using the above described procedure.

It is understood that the above descriptions are for purposes of illustration and are not meant to be limiting.

Figure 7B:
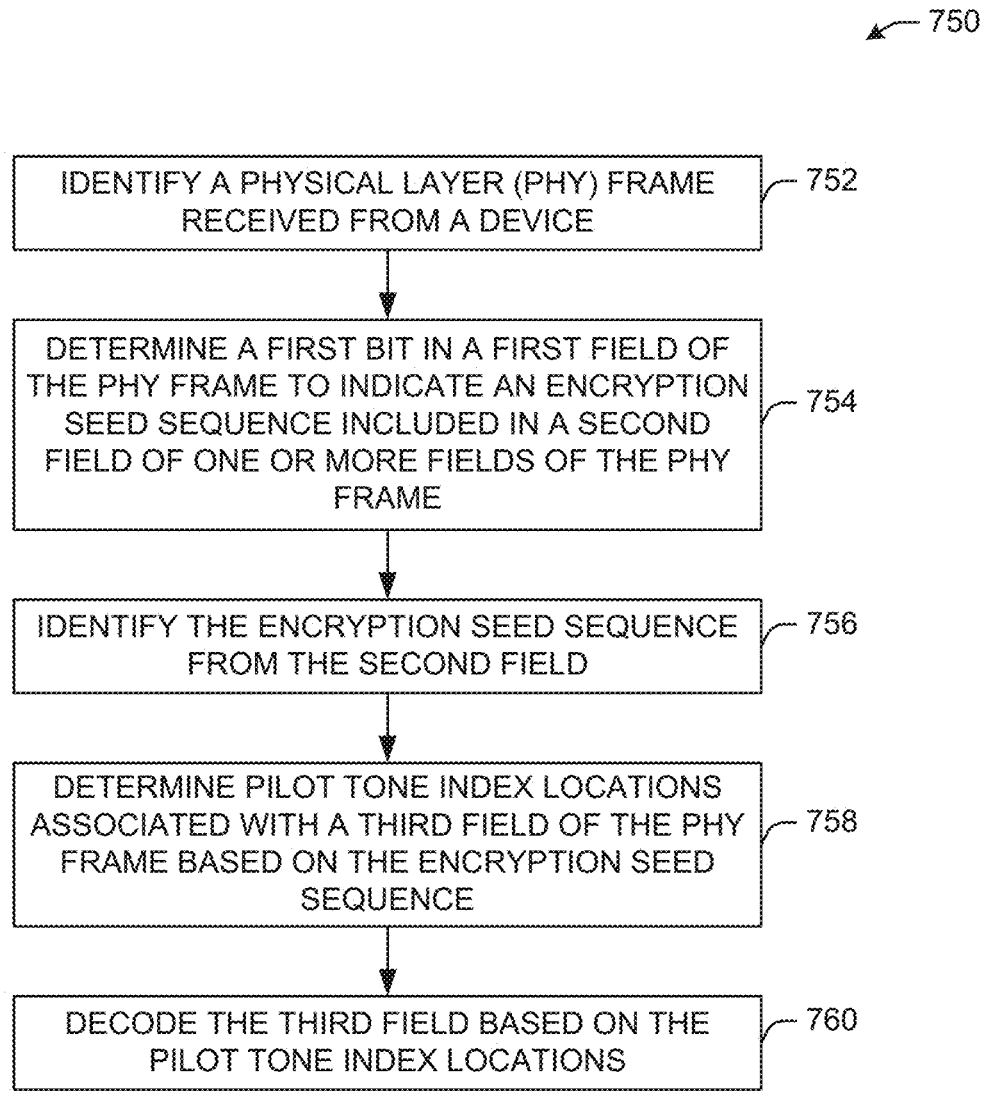
FIG. 7B illustrates a flow diagram of illustrative process for an illustrative enhanced PHY layer security system, in accordance with one or more example embodiments of the present disclosure

FIG. 7B illustrates a flow diagram of an illustrative process 750 for an illustrative enhanced PHY layer security system, in accordance with one or more example embodiments of the present disclosure.

At block 752, a device (e.g., the user device(s) 120 and/or the AP 102 of FIG. 1) may identify a physical layer (PHY) frame received from a device. The PHY frame may be legitimate or a fake frame. For example, a hacker may have intercepted the frame and altered it in such a way that it may cause issues on the device when the device is decoding that frame.

At block 754, the device may determine a first bit in a first field of the PHY frame to indicate an encryption seed sequence included in a second field of one or more fields of the PHY frame. For example, the user device 120 of FIG. 1 may analyze the received symbols associated with one or more fields of the frame. The user device may extract a bit that may be located in a reserve bit in a first field of the PHY frame (e.g., in the HE-SIG-A1). The bit may be identified as a "pilot encrypted" subfield. For example, looking at HE-SIG-A1 350 in FIG. 3B, the pilot encrypted subfield 358 may be used by the AP to indicate whether there is encryption or not.

At block 756, the device may identify the encryption seed sequence from the second field. In order for legitimate user devices to compute the pilot tone allocation of a next symbol, the AP may use the "BSS Color" subfield. The AP may set the value of a predetermined bit (e.g., "Reserved") to "1" to indicate that the BSS color subfield contains the "seed" value for computing pilot mapping information for decoding one or more next symbols/fields in the PHY frame or PPDU.

At block 758, the device may determine pilot tone index locations associated with a third field of the PHY frame based on the encryption seed sequence. The user device may determine the pilot tone allocation for other fields in the PHY frame based on the "seed" value included in the BSS color subfield by employing or more mechanisms. There can be multiple ways to randomize the pilot tone allocation for the OFDM symbol of other fields. For example, a first mechanism may be a "keyed-hash" based encryption and a second mechanism may include an exclusive OR (XOR) based encryption. For example, the user device may use a keyed-hash message authentication code (HMAC) to calculate the pilot allocation information based on the shared key and the "seed" value in the HE-SIG-A or NG-SIG fields, as follows: Pilot Index=HMAC (shared key, seed) mod N; where the pilot index will be used to find the pilot allocation from a pre-defined lookup table (which is shared between the AP and user devices). N can be the size of the lookup table. Note that legitimate user devices obtain shared key information during their association/authentication process.

At block 760, the device may decode the third field based on the pilot tone index locations. Once the user device finds the pilot/data tone allocation (pilot tone index locations) based on information in HE-SIG-A1 or NG-SIG, the user device may use that information in the OFDM symbol de-mapper to decode the next OFDM symbol, for example, HE-SIG-A2 or other symbols. Note that HE-SIG-A1 or NG-SIG will be encoded with the conventional pilot/data tone allocation. Therefore, non-legitimate user devices may be able to correctly decode the HE-SIG-A1 or the NG-SIG, but will fail to decode the next symbols/fields. As a result, the non-legitimate user devices will fail at the CRC check and will send a PHY_RXEND.indication (format violation) to the MAC and enter the "End of Wait" state in the PHY receiver state machine. This will halt the processing of the PHY preamble. It is understood that the above descriptions are for purposes of illustration and are not meant to be limiting.

FIG. 8 shows a functional diagram of an exemplary communication station 800 in accordance with some embodiments. In one embodiment, FIG. 8 illustrates a functional block diagram of a communication station that may be suitable for use as an AP 102 (FIG. 1) or a user device 120 (FIG. 1) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include communications circuitry 802 and a transceiver 810 for transmitting and receiving signals to and from other communication stations using one or more antennas 801. The transceiver 810 may be a device comprising both a transmitter and a receiver that are combined and share common circuitry (e.g., communications circuitry 802). The communications circuitry 802 may include amplifiers, filters, mixers, analog to digital and/or digital to analog converters. The transceiver 810 may transmit and receive analog or digital signals. The transceiver 810 may allow reception of signals during transmission periods. This mode is known as full-duplex, and may require the transmitter and receiver to operate on different frequencies to minimize interference between the transmitted signal and the received signal. The transceiver 810 may operate in a half-duplex mode, where the transceiver 810 may transmit or receive signals in one direction at a time.

The communications circuitry 802 may include circuitry that can operate the physical layer (PHY) communications and/or media access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in FIGS. 1-7.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), an enhanced PHY layer security device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The enhanced PHY layer security device 919 may carry out or perform any of the operations and processes (e.g., processes 700 and 750) described and shown above. For example, the enhanced PHY layer security device 919 may be configured to "encrypt" a certain part of the PHY preamble (e.g., HE-SIG-A) so that only legitimate STAs (those which are associated with the AP) can decode the PHY preamble and proceed to decode the MAC header and data payload. The PHY preamble will be "encrypted" using a secure key shared between the AP and STAs during an association procedure. This will prevent non-legitimate STAs (or malicious devices) from correctly decoding the PHY preamble and detecting the frame type (e.g., TF).

The enhanced PHY layer security device 919 may encrypt/randomize orthogonal frequency-division multiplexing (OFDM) pilot tone allocations throughout the PPDU so that only legitimate STAs with the pre-shared key (PSK) (e.g., password, paraphrase, etc.) information can correctly identify the pilot tone allocations to decode the entire PPDU. This approach can also be extended to the data tones as well, but this discussion will focus on the pilot tones. Both approaches would provide even more protection. However, implementing the pilot tone protection provides significant protection, and minimizes hardware design changes from previous Wi-Fi standards. For this, a special signaling (SIG) field, called Next-Generation (NG)-SIG, may be part of the greenfield PHY design for next-generation Wi-Fi. This NG-SIG field may include a "seed" information field where the value of the "seed" field can be used by legitimate STAs to correctly "decrypt" the OFDM pilot (or data) tone allocation for the subsequent OFDM symbols (including additional PHY preambles and data payload). The decryption requires the shared key information exchanged between the AP and legitimate STAs during an association process over a secure channel. Therefore unintended STAs (e.g., hackers/attackers) cannot correctly decrypt the pilot location and will fail to decode the OFDM symbols following the NG-SIG.

The enhanced PHY layer security device 919 may provide a new PHY-layer protection which will be the first line of defense in the Wi-Fi stack. This will make next generation Wi-Fi systems much more secure, robust and privacy-friendly compared to today's Wi-Fi systems. This is especially the case when fast advances in machine-/deep-learning are considered and big data analytics, which enable hackers to infer more private information with less amount of low-level (PHY layer) data.

It is understood that the above are only a subset of what the enhanced PHY layer security device 919 may be configured to perform and that other functions included throughout this disclosure may also be performed by the enhanced PHY layer security device 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple-input multiple-output (MIMO) transceiver or device, a single-input multiple-output (SIMO) transceiver or device, a multiple-input single-output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may include a device comprising memory and processing circuitry configured to: determine a physical layer (PHY) frame to be sent to a station device; identify an encryption seed sequence to be used for encrypting a first portion of the PHY frame; include an indication of the encryption seed sequence in a first field of the PHY frame; encode the first portion of the PHY frame using the encryption seed sequence; and cause to send the PHY frame to the station device.

Example 2 may include the device of example 1 and/or some other example herein, wherein the first portion may be a signaling field of the PHY frame.

Example 3 may include the device of example 2 and/or some other example herein, wherein the signaling field of the PHY frame may include at least a high-efficiency signal A (HE-SIG-A) field or a next-generation Wi-Fi signal field (NG-SIG).

Example 4 may include the device of example 1 and/or some other example herein, wherein the memory and the processing circuitry are further configured to cause to set a bit in a second field associated with the first field, wherein the bit indicates that pilot tone index locations of the first portion of the PHY frame are encrypted.

Example 5 may include the device of example 4 and/or some other example herein, wherein the processing circuitry may be further configured to cause to send a shared key information associated with encrypting the pilot tone index locations.

Example 6 may include the device of example 4 and/or some other example herein, wherein the memory and the processing circuitry are further configured to determine a pilot index associated with a lookup table for the pilot tone index locations.

Example 7 may include the device of example 1 and/or some other example herein, wherein the memory and the processing circuitry are further configured to determine the pilot tone index locations based on performing a bitwise exclusive OR operation.

Example 8 may include the device of example 4 and/or some other example herein, wherein the memory and the processing circuitry are further configured to determine the pilot tone index locations are encrypted using a keyed-hash message authentication code.

Example 9 may include the device of example 1 and/or some other example herein, wherein the first field may be a basic service set (BSS) color field of the PHY frame.

Example 10 may include the device of example 1 and/or some other example herein, wherein the memory and the processing circuitry are further configured to include the encryption seed sequence in the first field of the PHY frame.

Example 11 may include the device of example 1 and/or some other example herein, further comprising a transceiver configured to transmit and receive wireless signals.

Example 12 may include the device of example 11 and/or some other example herein, further comprising one or more antennas coupled to the transceiver.

Example 13 may include a non-transitory computer-readable medium storing computer-executable instructions which when executed by one or more processors result in performing operations comprising: identifying a physical layer (PHY) frame received from a device; determining a first bit in a first field of the PHY frame to indicate an encryption seed sequence included in a second field the PHY frame; identifying the encryption seed sequence from the second field; determining pilot tone index locations associated with a third field of the PHY frame based on the encryption seed sequence; and decoding the third field based on the pilot tone index locations.

Example 14 may include the non-transitory computer-readable medium of example 13 and/or some other example herein, wherein the first field may be a signaling field included in the PHY frame.

Example 15 may include the non-transitory computer-readable medium of example 14 and/or some other example herein, wherein the signaling field may be a high-efficiency signal A (HE-SIG-A) field or a next-generation Wi-Fi signal field (NG-SIG).

Example 16 may include the non-transitory computer-readable medium of example 13 and/or some other example herein, wherein determining the first bit further indicates that the pilot tone index locations of a first portion of the PHY frame are encrypted.

Example 17 may include the non-transitory computer-readable medium of example 13 and/or some other example herein, wherein the operations further comprise computing the pilot tone index locations using a keyed-hash message authentication code (HMAC), wherein an input to the HMAC may include at least one of a shared key and the encrypting seed sequence.

Example 18 may include the non-transitory computer-readable medium of example 17 and/or some other example herein, wherein the shared key may be shared during association with the device.

Example 19 may include the non-transitory computer-readable medium of example 13 and/or some other example herein, wherein the operations further comprise determining the pilot tone index locations using a lookup table using a pilot tone index included in the PHY frame.

Example 20 may include the non-transitory computer-readable medium of example 13 and/or some other example herein, wherein the operations further comprise performing a cyclic redundancy code (CRC) check after decoding the third field of the PHY frame.

Example 21 may include a method comprising: determining, by one or more processors, a physical layer (PHY) frame to be sent to a station device; identifying an encryption seed sequence to be used for encrypting a first portion of the PHY frame; including an indication of the encryption seed sequence in a first field of the PHY frame; encoding the first portion of the PHY frame using the encryption seed sequence; and causing to send the PHY frame to the station device.

Example 22 may include the method of example 21 and/or some other example herein, wherein the first portion may be a signaling field of the PHY frame.

Example 23 may include the method of example 22 and/or some other example herein, wherein the signaling field of the PHY frame may include at least a high efficiency signal A (HE-SIG-A) field or a next-generation Wi-Fi signal field (NG-SIG).

Example 24 may include the method of example 21 and/or some other example herein, further comprising causing to set a bit in a second field associated with the first field, wherein the bit indicates that pilot tone index locations of the first portion of the PHY frame are encrypted Example 25 may include the method of example 24 and/or some other example herein, further comprising causing to send a shared key information associated with encrypting the pilot tone index locations.

Example 26 may include the method of example 24 and/or some other example herein, further comprising determining a pilot index associated with a lookup table for the pilot tone index locations.

Example 27 may include the method of example 21 and/or some other example herein, further comprising determining the pilot tone index locations based on performing a bitwise exclusive OR operation.

Example 28 may include the method of example 24 and/or some other example herein, further comprising determining the pilot tone index locations are encrypted using a keyed-hash message authentication code.

Example 29 may include the method of example 21 and/or some other example herein, wherein the first field may be a basic service set (BSS) color field of the PHY frame.

Example 30 may include the method of example 21 and/or some other example herein, further comprising including the encryption seed sequence in the first field of the PHY frame.

Example 31 may include an apparatus comprising means for performing a method as claimed in any one of examples 21-30.

Example 32 may include a system comprising at least one memory device having programmed instruction that, in response to execution, cause at least one processor to perform the method of any one of examples 21-30.

Example 33 may include a machine readable medium including code, when executed, to cause a machine to perform the method of any one of examples 21-30.

Example 34 may include a non-transitory computer-readable medium storing computer-executable instructions that when executed by one or more processors result in performing operations comprising: determining a physical layer (PHY) frame to be sent to a station device; identifying an encryption seed sequence to be used for encrypting a first portion of the PHY frame; including an indication of the encryption seed sequence in a first field of the PHY frame; encoding the first portion of the PHY frame using the encryption seed sequence; and causing to send the PHY frame to the station device.

Example 35 may include the non-transitory computer-readable medium of example 34 and/or some other example herein, wherein the first portion may be a signaling field of the PHY frame.

Example 36 may include the non-transitory computer-readable medium of example 35 and/or some other example herein, wherein the signaling field of the PHY frame may include at least a high-efficiency signal A (HE-SIG-A) field or a next-generation Wi-Fi signal field (NG-SIG).

Example 37 may include the non-transitory computer-readable medium of example 34 and/or some other example herein, wherein the operations further comprise causing to set a bit in a second field associated with the first field, wherein the bit indicates that pilot tone index locations of the first portion of the PHY frame are encrypted.

Example 38 may include the non-transitory computer-readable medium of example 37 and/or some other example herein, wherein the operations further comprise causing to send a shared key information associated with encrypting the pilot tone index locations.

Example 39 may include the non-transitory computer-readable medium of example 37 and/or some other example herein, wherein the operations further comprise determining a pilot index associated with a lookup table for the pilot tone index locations.

Example 40 may include the non-transitory computer-readable medium of example 34 and/or some other example herein, wherein the operations further comprise determining the pilot tone index locations based on performing a bitwise exclusive OR operation.

Example 41 may include the non-transitory computer-readable medium of example 37 and/or some other example herein, wherein the operations further comprise determining the pilot tone index locations are encrypted using a keyed-hash message authentication code.

Example 42 may include the non-transitory computer-readable medium of example 34 and/or some other example herein, wherein the first field may be a basic service set (BSS) color field of the PHY frame.

Example 43 may include the non-transitory computer-readable medium of example 34 and/or some other example herein, wherein the operations further comprise including the encryption seed sequence in the first field of the PHY frame.

Example 44 may include an apparatus comprising means for determining a physical layer (PHY) frame to be sent to a station device; means for identifying an encryption seed sequence to be used for encrypting a first portion of the PHY frame; means for including an indication of the encryption seed sequence in a first field of the PHY frame; means for encoding the first portion of the PHY frame using the encryption seed sequence; and means for causing to send the PHY frame to the station device.

Example 45 may include the apparatus of example 44 and/or some other example herein, wherein the first portion may be a signaling field of the PHY frame.

Example 46 may include the apparatus of example 45 and/or some other example herein, wherein the signaling field of the PHY frame may include at least a high-efficiency signal A (HE-SIG-A) field or a next-generation Wi-Fi signal field (NG-SIG).

Example 47 may include the apparatus of example 44 and/or some other example herein, further comprising causing to set a bit in a second field associated with the first field, wherein the bit indicates that pilot tone index locations of the first portion of the PHY frame are encrypted.

Example 48 may include the apparatus of example 47 and/or some other example herein, further comprising causing to send a shared key information associated with encrypting the pilot tone index locations.

Example 49 may include the apparatus of example 47 and/or some other example herein, further comprising determining a pilot index associated with a lookup table for the pilot tone index locations.

Example 50 may include the apparatus of example 44 and/or some other example herein, further comprising determining the pilot tone index locations based on performing a bitwise exclusive OR operation.

Example 51 may include the apparatus of example 47 and/or some other example herein, further comprising determining the pilot tone index locations are encrypted using a keyed-hash message authentication code.

Example 52 may include the apparatus of example 44 and/or some other example herein, wherein the first field may be a basic service set (BSS) color field of the PHY frame.

Example 53 may include the apparatus of example 44 and/or some other example herein, further comprising including the encryption seed sequence in the first field of the PHY frame.

Example 54 may include a device comprising memory and processing circuitry configured to: identify a physical layer (PHY) frame received from a device; determine a first bit in a first field of the PHY frame to indicate an encryption seed sequence included in a second field the PHY frame; identify the encryption seed sequence from the second field; determine pilot tone index locations associated with a third field of the PHY frame based on the encryption seed sequence; and decode the third field based on the pilot tone index locations.

Example 55 may include the device of example 54 and/or some other example herein, wherein the first field may be a signaling field included in the PHY frame.

Example 56 may include the device of example 55 and/or some other example herein, wherein the signaling field may be a high-efficiency signal A (HE-SIG-A) field or a next-generation Wi-Fi signal field (NG-SIG).

Example 57 may include the device of example 54 and/or some other example herein, wherein determining the first bit further indicates that the pilot tone index locations of a first portion of the PHY frame are encrypted.

Example 58 may include the device of example 54 and/or some other example herein, wherein the memory and processing circuitry are further configured to compute the pilot tone index locations using a keyed-hash message authentication code (HMAC), wherein an input to the HMAC may include at least one of a shared key and the encrypting seed sequence.

Example 59 may include the device of example 58 and/or some other example herein, wherein the shared key may be shared during association with the device.

Example 60 may include the device of example 54 and/or some other example herein, wherein the memory and processing circuitry are further configured to determine the pilot tone index locations using a lookup table using a pilot tone index included in the PHY frame.

Example 61 may include the device of example 54 and/or some other example herein, wherein the memory and processing circuitry are further configured to perform a cyclic redundancy code (CRC) check after decoding the third field of the PHY frame.

Example 62 may include the device of example 54 further comprising a transceiver configured to transmit and receive wireless signals.

Example 63 may include the device of example 62 and/or some other example herein, further comprising one or more antennas coupled to the transceiver.

Example 64 may include a method comprising: identifying a physical layer (PHY) frame received from a device; determining a first bit in a first field of the PHY frame to indicate an encryption seed sequence included in a second field the PHY frame; identifying the encryption seed sequence from the second field; determining pilot tone index locations associated with a third field of the PHY frame based on the encryption seed sequence; and decoding the third field based on the pilot tone index locations.

Example 65 may include the method of example 64 and/or some other example herein, wherein the first field may be a signaling field included in the PHY frame.

Example 66 may include the method of example 65 and/or some other example herein, wherein the signaling field may be a high-efficiency signal A (HE-SIG-A) field or a next-generation Wi-Fi signal field (NG-SIG).

Example 67 may include the method of example 64 and/or some other example herein, wherein determining the first bit further indicates that the pilot tone index locations of a first portion of the PHY frame are encrypted.

Example 68 may include the method of example 64 and/or some other example herein, further comprising computing the pilot tone index locations using a keyed-hash message authentication code (HMAC), wherein an input to the HMAC may include at least one of a shared key and the encrypting seed sequence.

Example 69 may include the method of example 68 and/or some other example herein, wherein the shared key may be shared during association with the device.

Example 70 may include the method of example 64 and/or some other example herein, further comprising determining the pilot tone index locations using a lookup table using a pilot tone index included in the PHY frame.

Example 71 may include the method of example 64 and/or some other example herein, further comprising performing a cyclic redundancy code (CRC) check after decoding the third field of the PHY frame.

Example 72 may include an apparatus comprising means for performing a method as claimed in any one of examples 64-71.

Example 73 may include a system comprising at least one memory device having programmed instruction that, in response to execution, cause at least one processor to perform the method of any one of examples 64-71.

Example 74 may include a machine readable medium including code, when executed, to cause a machine to perform the method of any one of examples 64-71.

Example 75 may include an apparatus comprising means for identifying a physical layer (PHY) frame received from a device; means for determining a first bit in a first field of the PHY frame to indicate an encryption seed sequence included in a second field the PHY frame; means for identifying the encryption seed sequence from the second field; means for determining pilot tone index locations associated with a third field of the PHY frame based on the encryption seed sequence; and means for decoding the third field based on the pilot tone index locations.

Example 76 may include the apparatus of example 75 and/or some other example herein, wherein the first field may be a signaling field included in the PHY frame.

Example 77 may include the apparatus of example 76 and/or some other example herein, wherein the signaling field may be a high-efficiency signal A (HE-SIG-A) field or a next-generation Wi-Fi signal field (NG-SIG).

Example 78 may include the apparatus of example 75 and/or some other example herein, wherein means for determining the first bit further indicates that the pilot tone index locations of a first portion of the PHY frame are encrypted.

Example 79 may include the apparatus of example 75 and/or some other example herein, further comprising means for computing the pilot tone index locations using a keyed-hash message authentication code (HMAC), wherein an input to the HMAC may include at least one of a shared key and the encrypting seed sequence.

Example 80 may include the apparatus of example 79 and/or some other example herein, wherein the shared key may be shared during association with the device.

Example 81 may include the apparatus of example 75 and/or some other example herein, further comprising means for determining the pilot tone index locations using a lookup table using a pilot tone index included in the PHY frame.

Example 82 may include the apparatus of example 75 and/or some other example herein, further comprising means for performing a cyclic redundancy code (CRC) check after decoding the third field of the PHY frame.

Example 83 may include an apparatus comprising means for performing a method as claims in any one of the preceding example.

Example 84 may include a machine-readable storage including machine-readable instructions, when executed, to implement a method as claimed in any preceding example.

Example 85 may include a machine-readable storage including machine-readable instructions, when executed, to implement a method of realize an apparatus as claimed in any preceding example.

Example 86 may include one or more non-transitory computer-readable media comprising instructions to cause an electronic device, upon execution of the instructions by one or more processors of the electronic device, to perform one or more elements of a method described in or related to any of examples 1-85, or any other method or process described herein.

Example 87 may include an apparatus comprising logic, modules, and/or circuitry to perform one or more elements of a method described in or related to any of examples 1-85, or any other method or process described herein.

Example 88 may include a method, technique, or process as described in or related to any of examples 1-85, or portions or parts thereof.

Example 89 may include an apparatus comprising: one or more processors and one or more computer readable media comprising instructions that, when executed by the one or more processors, cause the one or more processors to perform the method, techniques, or process as described in or related to any of examples 1-85 or portions thereof.

Example 90 may include a method of communicating in a wireless network as shown and described herein.

Example 91 may include a system for providing wireless communication as shown and described herein.

Example 92 may include a device for providing wireless communication as shown and described herein.

Embodiments according to the disclosure are in particular disclosed in the attached examples directed to a method, a storage medium, a device and a computer program product, wherein any feature mentioned in one example category, e.g., method, can be claimed in another example category, e.g., system, as well. The dependencies or references back in the attached examples are chosen for formal reasons only. However, any subject matter resulting from a deliberate reference back to any previous examples (in particular multiple dependencies) can be claimed as well, so that any combination of examples and the features thereof are disclosed and can be claimed regardless of the dependencies chosen in the attached examples. The subject-matter which can be claimed comprises not only the combinations of features as set out in the attached examples but also any other combination of features in the examples, wherein each feature mentioned in the examples can be combined with any other feature or combination of other features in the examples. Furthermore, any of the embodiments and features described or depicted herein can be claimed in a separate example and/or in any combination with any embodiment or feature described or depicted herein or with any of the features of the attached examples.

The foregoing descriptions of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising memory and processing circuitry configured to:
   determine a physical layer (PHY) frame to be sent to a station device;
   identify an encryption seed sequence to be used for encrypting a first portion of the PHY frame;
   include an indication of the encryption seed sequence in a first field of the PHY frame;
   encode the first portion of the PHY frame using the encryption seed sequence;
   cause to set a bit in a second field associated with the first field, wherein the bit indicates that pilot tone index locations of the first portion of the PHY frame are encrypted;
   cause to send a shared key information associated with encrypting the pilot tone index locations; and
   cause to send the PHY frame to the station device.

2. The device of claim 1, wherein the first portion is a signaling field of the PHY frame.

3. The device of claim 2, wherein the signaling field of the PHY frame includes at least a high-efficiency signal A (HE-SIG-A) field or a next-generation Wi-Fi signal field (NG-SIG).

4. The device of claim 1, wherein the memory and the processing circuitry are further configured to determine a pilot index associated with a lookup table for the pilot tone index locations.

5. The device of claim 1, wherein the memory and the processing circuitry are further configured to determine the pilot tone index locations based on performing a bitwise exclusive OR operation.

6. The device of claim 5, wherein the memory and the processing circuitry are further configured to determine the pilot tone index locations are encrypted using a keyed-hash message authentication code.

7. The device of claim 1, wherein the first field is a basic service set (BSS) color field of the PHY frame.

8. The device of claim 1, wherein the memory and the processing circuitry are further configured to include the encryption seed sequence in the first field of the PHY frame.

9. The device of claim 1, further comprising a transceiver configured to transmit and receive wireless signals.

10. The device of claim 9, further comprising one or more antennas coupled to the transceiver.

11. A non-transitory computer-readable medium storing computer-executable instructions which when executed by one or more processors result in performing operations comprising:
    identifying a physical layer (PHY) frame received from a device;
    determining a first bit in a first field of the PHY frame to indicate an encryption seed sequence included in a second field the PHY frame, wherein determining the first bit further indicates that pilot tone index locations of a first portion of the PHY frame are encrypted, an wherein a shared key associated with encrypting the pilot tone index locations is shared during association with the device;
    identifying the encryption seed sequence from the second field;
    determining pilot tone index locations associated with a third field of the PHY frame based on the encryption seed sequence; and
    decoding the third field based on the pilot tone index locations.

12. The non-transitory computer-readable medium of claim 11, wherein the first field is a signaling field included in the PHY frame.

13. The non-transitory computer-readable medium of claim 12, wherein the signaling field is a high-efficiency signal A (HE-SIG-A) field or a next-generation Wi-Fi signal field (NG-SIG).

14. The non-transitory computer-readable medium of claim 11, wherein the operations further comprise computing the pilot tone index locations using a keyed-hash message authentication code (HMAC), wherein an input to the HMAC includes at least one of the shared key and the encrypting seed sequence.

15. The non-transitory computer-readable medium of claim 11, wherein the operations further comprise determining the pilot tone index locations using a lookup table using a pilot tone index included in the PHY frame.

16. The non-transitory computer-readable medium of claim 11, wherein the operations further comprise performing a cyclic redundancy code (CRC) check after decoding the third field of the PHY frame.

* * * * *